Oct. 14, 1924.  
F. H. CHILSON  
FOOD HOLDING AND SERVING DEVICE  
Filed Nov. 7, 1921  
1,511,265
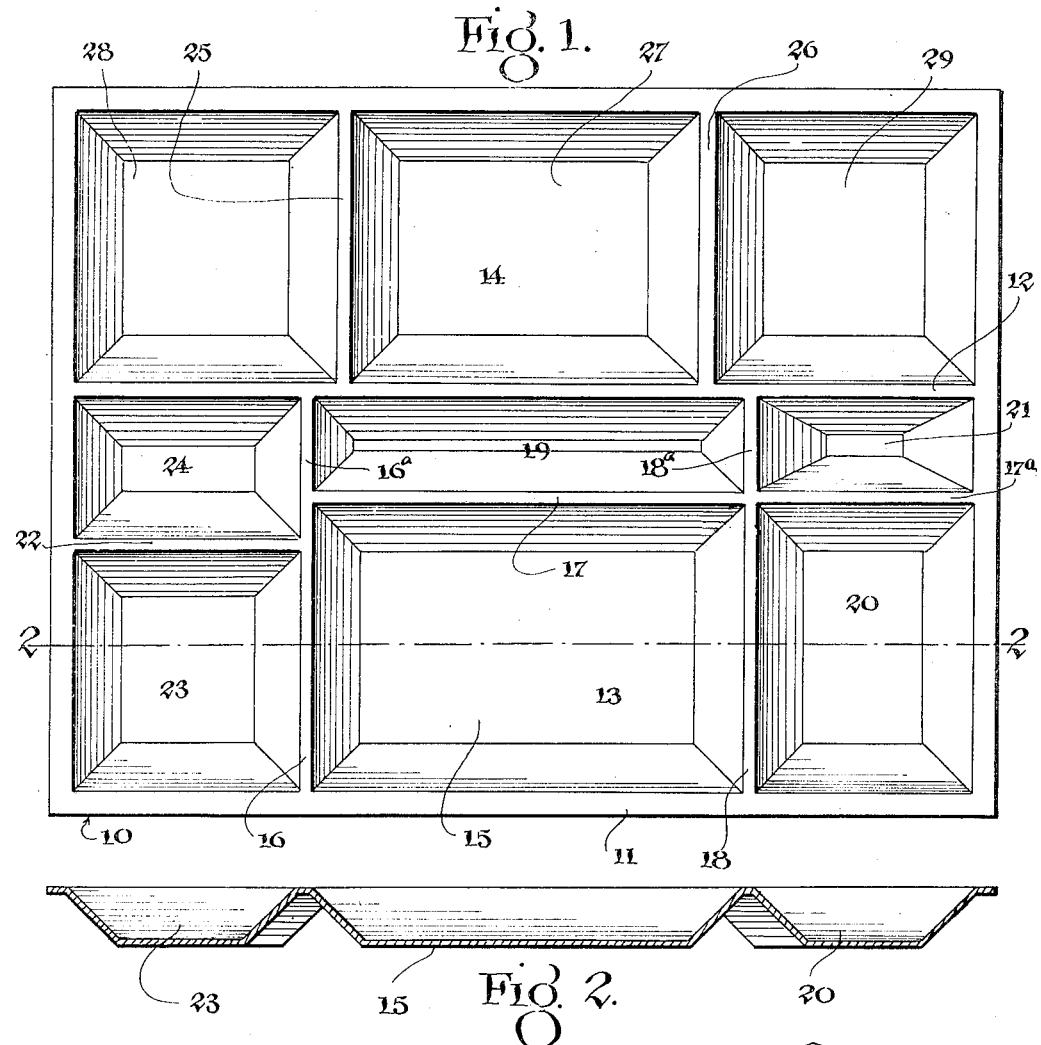
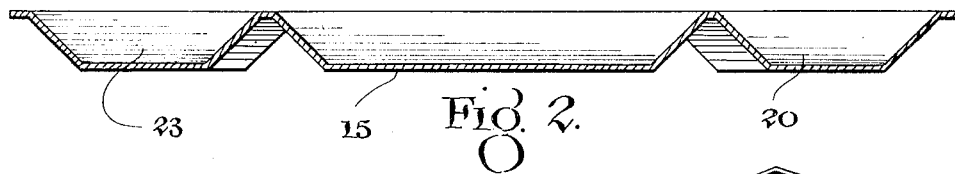
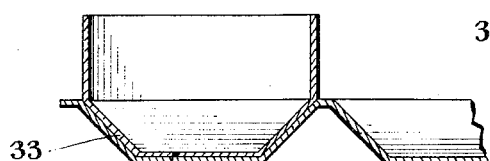
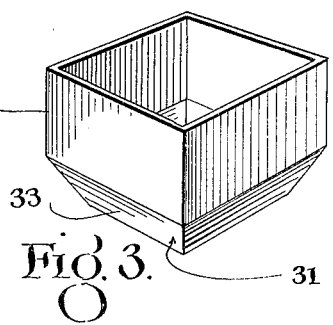
WITNESSES
INVENTOR  
FRANK HIRAM CHILSON.  
BY  
ATTORNEYS Patented Oct. 14, 1924.

1,511,265

UNITED STATES PATENT OFFICE.

FRANK HIRAM CHILSON, OF HAMPTON ROADS, VIRGINIA.

FOOD HOLDING AND SERVING DEVICE.

Application filed November 7, 1921. Serial No. 513,531.

*To all whom it may concern:*

Be it known that I, FRANK HIRAM CHILSON, a citizen of the United States, and a resident of Hampton Roads, in the county of Norfolk and State of Virginia, have invented certain new and useful Improvements in Food Holding and Serving Devices, of which the following is a specification.

The present invention relates in general to food holding and serving devices, and more particularly to a dinner holder or plate especially adapted for cafeteria service.

The object of the invention is to provide a device of this character which relieves a patron of the necessity of the burdensome preparation which must now be made before the patron can be served, which relieves the attendant of the necessity of handling numerous dishes, utensils or the like, and in which the compartments are of such character and so organized that the plate does not occupy any more table space than the average person requires and yet the compartments are placed after the manner in which the food is customarily served whereby the plate is highly adapted for cafeteria service and effective to permit of the patrons being served, with the least possible delay and with the best possible manner.

Another object is to provide a plate or tray of this character which is of simple and durable construction, of attractive and ornamental appearance and at the same time easy and inexpensive to manufacture.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a plan view of the preferred embodiment of the invention;

Figure 2 is a view in longitudinal vertical section, on line 2—2 of Figure 1;

Figure 3 is a detail perspective view of the soup container; and

Figure 4 is a fragmentary view in vertical section, illustrating the soup container received in its compartment in the tray.

Referring to the drawings wherein for the sake of illustration is shown the preferred embodiment of the invention, the numeral 10 designates generally the tray or plate which constitutes the invention. This tray or plate is preferably constructed of aluminum or aluminum composition or other non-corrosive metal and has its compartments, to be hereinafter more fully described pressed therefrom. The plate is constructed with a marginal flange or ledge 11 and with a longitudinally extending flat ridge 12 which divides the tray generally into two zones, a front zone 13 which lies adjacent the diner when in use and a rear zone 14 which lies remote from the diner, when in use.

The front zone 13 includes a relatively large and centrally disposed service compartment 15 defined by flat ridges 16, 17 and 18 and to the rear of the service compartment and within the front zone a knife, fork and spoon compartment 19 is provided, this latter compartment being defined by the ridges 12 and 17 and extensions 16$^a$ and 18$^a$ of the ridges 16 and 18, respectively. On one side of the service compartment a pie, cake or sauce compartment 20 is provided and is defined by the adjacent portions of the marginal flange or ledge, the ridge 18 and an extension 18$^a$ of the ridge 17$^a$. To the rear of the compartment 20 a butter chip compartment 21 is arranged, the compartment 21 being defined by the extension ridges 18$^a$ and 17$^a$ and the portions of the ledge 12 and marginal flange comprehended between these extension ridges. On the side of the tray opposite from the compartments 20 and 21 a flat top ridge 22 coacts with the ridge 16 and its extension 16$^a$ and the comprehended portions of the marginal flange and longitudinal ridge 12 to define a combined vegetable, salad and soup container compartment 23 and potato compartment 24.

In the zone 14 three compartments are provided and are defined by flat top ridges 25 and 26 which extend parallel to each other and at right angles to the longitudinally extending ridge 12. These ridges are so related and placed as to provide a central or relatively large meat compartment 27 and a bread compartment 28 on one side thereof and a tea or coffee pot compartment 29 on the other side thereof.

The compartment 23 is also adapted to serve as a soup container compartment, and for this purpose is adapted to coact with the soup container 30 which includes a base 31 having a bottom wall 32 and inclined side wall 33 corresponding in contour to the compartment 23. In use, the container 30 has its base 31 set in the compartment 23 with the bottom wall 32 resting on the bottom wall of the compartment and the inclined side walls of the container resting on the inclined side walls of the compartment.

In use, the tray or plate provides a compact and ornamental article possessed of a high degree of utility. It provides in a single unitary structure a complete service, wherein the compartments which correspond to the various dishes and accommodate the various utensils are disposed in the customary manner and dispose the food in a manner not only convenient but also pleasing to the taste. The tray or plate is susceptible of ready handling and of definite and thorough cleansing after use and to the cleansing operation it presents no greater difficulties than the ordinary utensil.

The soup container when received in the compartment provided therefor is firmly seated and is not liable to become displaced and this without presenting any locking means between the soup container and the part which receives the same and without impairing the adaptability of this compartment to serve as a vegetable or salad compartment when it is so desired.

I claim:

1. A tray for cafeteria service constructed of a single sheet of aluminum pressed to form food receiving compartments, said tray having a continuous flat border flange and a continuous flat top longitudinal ridge extending from the border flange from opposite sides of the tray, and beyond the median line of the tray, dividing the tray into front and rear zones of unequal area, the front zone having longitudinal and transverse flat top ridges which with the border flange define its food compartments and an intermediate service plate, and the rear zone having transverse flat top ridges which with the longitudinal and border flanges define its food compartments.

2. A tray for cafeteria service constructed of aluminum and consisting of a continuous border flange and a flat top longitudinally extending ridge intermediate its front and rear sides connected with the border flange defining a front zone and a rear zone, said front zone having transversely extending ridges and longitudinally extending ridges which with the border flange define a central service plate at the front, said transverse ridges having extensions coacting with the longitudinal ridge defining a knife and fork, and spoon compartment, the longitudinally extending ridge of the front zone having an extension coacting with one of the transversely extending ridges and with the comprehended portion of the longitudinally extending ridge and of the border flange defining a pie and cake and sauce compartment and a butter chip compartment, said front zone also having a short longitudinal ridge extending between the border flange and the other of the said transverse ridges defining a potato compartment, a combined vegetable or salad compartment and soup container compartment, said rear zone having transversely extending ridges which with the border flange define a meat compartment, a bread compartment and a tea and coffee compartment, and a soup container adapted to be removably mounted in said soup container compartment, the said ridges and border flange being integral.

FRANK HIRAM CHILSON.